D. G. RICH.
Milking-Pail.

No. 203,500. Patented May 7, 1878.

WITNESSES:
W. W. Hollingsworth
Edw. W. Byrn

INVENTOR:
Dealton G. Rich
BY
ATTORNEYS.

UNITED STATES PATENT OFFICE.

DEALTON G. RICH, OF SAND BANK, NEW YORK, ASSIGNOR TO HIMSELF AND MORGAN L. RICH, OF SAME PLACE.

IMPROVEMENT IN MILKING-PAILS.

Specification forming part of Letters Patent No. 203,500, dated May 7, 1878; application filed March 8, 1878.

*To all whom it may concern:*

Be it known that I, DEALTON G. RICH, of Sand Bank, in the county of Oswego and State of New York, have invented a new and Improved Milking-Pail; and I do hereby declare that the following is a full, clear, and exact description of the same, reference being had to the accompanying drawing, forming part of this specification, in which—

Figure 1:
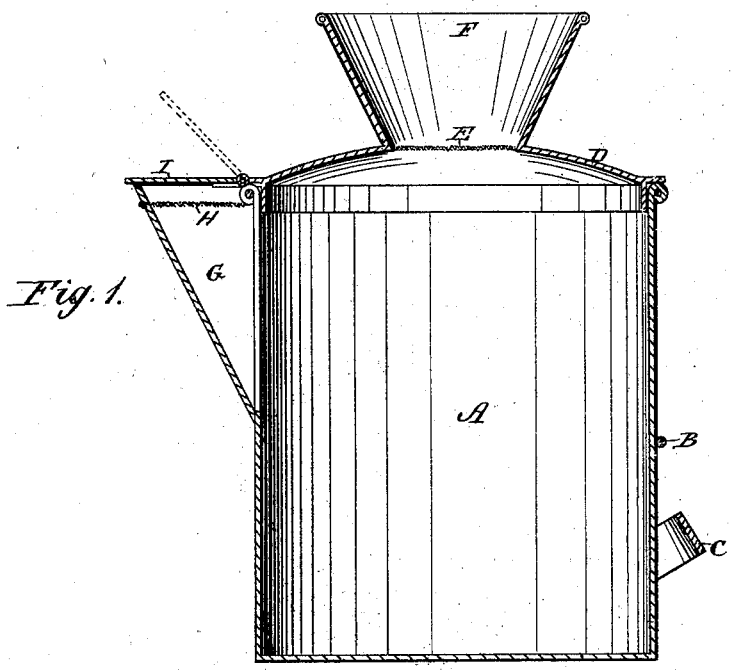
Figure 2:
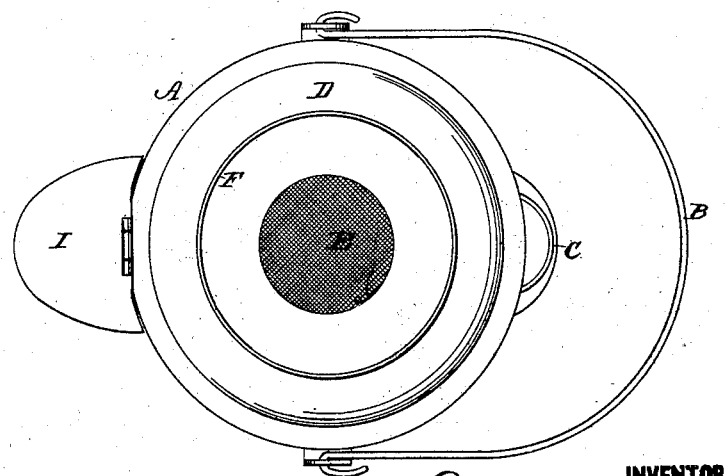

Figure 1 is a vertical section; Fig. 2, a plan view.

My invention relates to an improved milking-pail designed to exclude dirt and other foreign substances, and to secure both the straining of the milk before its reception into the pail, and again in pouring the same from the pail without removing the cover.

The improvement consists in the construction of the cover, which is made with a central strainer of gauze-wire, having about the edges of the same a raised and flaring hopper or wide funnel, which is permanently fixed to the cover, and into which the stream of milk is directed.

In the drawing, A represents the body of a milk-pail, which may be made of tin or other material, and in a cylindrical or other suitable form, the said body portion being provided, as usual, with a bail, B, for carrying the same, and a handle, C, for tilting the pail in pouring out the milk.

D is the cover, which is made with a flange to pass inside and fit the top of the pail. Said cover has in its center an opening, through which the milk passes to the interior, which opening is provided with a fixed strainer, E, of gauze-wire, and about the edges of which is permanently soldered a raised flaring hopper or wide funnel, F, into which the stream of milk is directed in milking.

I am aware that a removable funnel and strainer have been employed heretofore in a milk-pail, in which the straight tubular portion of the funnel was removably inserted in a corresponding socket-tube, and I therefore only claim the cover provided with a fixed flared hopper having no tubular portion, the distinctive merit of which arrangement is, that it serves the double function, first, of receiving and conducting the milk to the pail, and, secondly, of affording, by reason of its fixed character, a handle whereby the cover may be removed.

To secure the second straining of the milk, and without removing the cover, a spout, G, is arranged in one side of the pail, and in the same is fixed, near its upper edge, a gauze-wire strainer, H, and to the cover, and just above the spout G, is hinged a flap, I, which, when the cover is in place, extends over the open end of the spout, and screens it from dirt and foreign matter. This arrangement, it will be seen, permits the milk to be poured out and strained a second time without removing the cover, the hinged flap rising to permit the flow of the milk, and falling back again when the flow is stopped.

Having thus described my invention, what I claim as new is—

The combination, with a milk-pail, of a removable cover, D, having in the center of the same a fixed strainer, E, and a hopper, F, made with straight flaring sides, and fixed permanently to the cover, substantially as and for the purpose described.

DEALTON G. RICH.

Witnesses:
AARON FULLER,
C. D. PALMER.